United States Patent
Zheng (10) Patent No.: US 10,295,422 B2
(45) Date of Patent: May 21, 2019

(54) QUASI-DIFFERENTIAL CAPACITIVE MEMS PRESSURE SENSOR AND MANUFACTURING METHODS THEREOF

(71) Applicant: GOERTEK.INC, Weifang, Shandong (CN)

(72) Inventor: Guoguang Zheng, Weifang (CN)

(73) Assignee: GOERTEK.INC, Weifang, Shandong (CN)

( * ) Notice: Subject to any disclaimer, the term of this patent is extended or adjusted under 35 U.S.C. 154(b) by 0 days.

(21) Appl. No.: 15/559,311

(22) PCT Filed: Dec. 10, 2015

(86) PCT No.: PCT/CN2015/096917
§ 371 (c)(1),
(2) Date: Sep. 18, 2017

(87) PCT Pub. No.: WO2016/192361
PCT Pub. Date: Dec. 8, 2016

(65) Prior Publication Data
US 2018/0113040 A1 Apr. 26, 2018

(30) Foreign Application Priority Data
May 29, 2015 (CN) .......................... 2015 1 0290391

(51) Int. Cl.
*G01L 9/00* (2006.01)
*G01L 9/12* (2006.01)
(Continued)

(52) U.S. Cl.
CPC .............. *G01L 9/0072* (2013.01); *G01L 9/12* (2013.01); *G01L 13/025* (2013.01); *G01L 19/0618* (2013.01)

(58) Field of Classification Search
CPC ... G01L 9/0041; G01L 9/0072; G01L 13/025; G01L 19/0618
See application file for complete search history.

(56) References Cited

U.S. PATENT DOCUMENTS 5,316,619 A 5/1994 Mastrangelo
2010/0242617 A1 9/2010 Silverbrook et al.

FOREIGN PATENT DOCUMENTS

CN 101476960 A 7/2009
CN 102075839 A 5/2011
(Continued)

OTHER PUBLICATIONS

The First Chinese Office Action dated Oct. 24, 2016; Appln. No. 201510290391.X.
(Continued)

*Primary Examiner* — Erika J Villaluna
(74) *Attorney, Agent, or Firm* — Ladas & Parry LLP (57) ABSTRACT

The present invention discloses a quasi-differential capacitive MEMS pressure sensor and manufacturing methods thereof. The quasi-differential capacitive MEMS pressure sensor includes a first lower electrode, a second lower electrode, a first upper electrode supported above the first lower electrode, and a second upper electrode supported above the second lower electrode, wherein the first upper electrode is a pressure-sensitive film, and a cavity between the first upper electrode and the first lower electrode is a closed cavity, so that the first upper electrode and the first lower electrode constitute an air pressure-sensitive type capacitor; and the second upper electrode and the second lower electrode constitute a reference capacitor whose capacitance does not vary with external air pressure. The pressure sensor provided by the present invention can at least partially filter out a common-mode interference signal in an output signal of the air pressure-sensitive type capaci- (Continued)

tor by use of the reference capacitor, thereby improving the stability and resolution of the output signal of the air pressure-sensitive type capacitor.

9 Claims, 4 Drawing Sheets

(51) Int. Cl.
*G01L 13/02* (2006.01)
*G01L 19/06* (2006.01)

(56) References Cited

FOREIGN PATENT DOCUMENTS

| CN | 103994854 A | 8/2014 |
|---|---|---|
| CN | 104142206 A | 11/2014 |
| CN | 104848982 A | 8/2015 |
| CN | 104891418 A | 9/2015 |
| CN | 204881958 U | 12/2015 |

OTHER PUBLICATIONS

The Second Chinese Office Action dated Jun. 5, 2017; Appln. No. 201510290391.X.
The Chinese Notification to Grant Patent Right dated Nov. 10, 2017; Appln. No. 201510290391.X.

QUASI-DIFFERENTIAL CAPACITIVE MEMS PRESSURE SENSOR AND MANUFACTURING METHODS THEREOF

CROSS REFERENCE TO RELATED APPLICATION

This application is a national stage application, filed under 35 U.S.C. § 371, of International Application No. PCT/CN2015/096917, filed on Dec. 10, 2015, which claims priorities to Chinese Application No. 201510290391.X filed on May 29, 2015, the contents of which are hereby incorporated by reference in their entirety.

FIELD OF THE INVENTION

The present invention relates to the field of sensors, and more particularly, to a quasi-differential capacitive MEMS (Micro-electromechanical System) pressure sensor and manufacturing methods thereof.

BACKGROUND OF THE INVENTION

Figure 1:
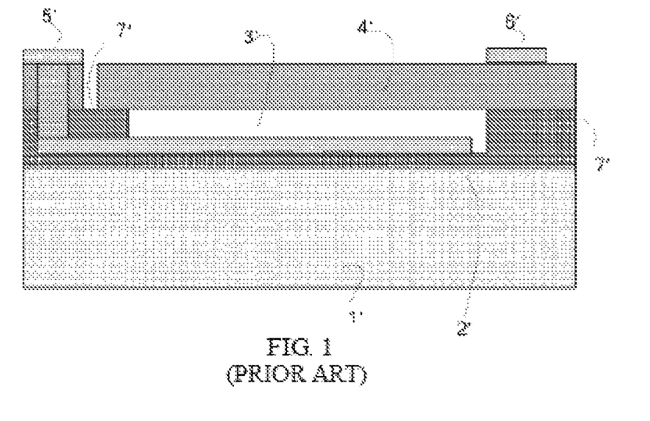
FIG. 1 is a section view of a conventional capacitive pressure sensor.

A capacitive MEMS pressure sensor is a sensor that characterizes a value of a pressure acted to a pressure-sensitive layer by using a capacitance between the pressure-sensitive layer, which acts as an upper electrode, and a lower electrode. A conventional capacitive MEMS pressure sensor typically uses a single capacitor for pressure detection. As shown in FIG. 1, the conventional capacitive MEMS pressure sensor comprises a substrate 1', an insulating layer 2' formed on the substrate 1', a lower electrode 3' formed on the insulating layer 2', and a pressure-sensitive film supported above the lower electrode 3' via a supporting part 7', wherein the lower electrode 3' is electrically connected to a lower electrode bonding pad 5'; and the pressure-sensitive film, which acts as the upper electrode 4', is electrically connected to an upper electrode bonding pad 6'. A pressure detection principle by using this capacitive MEMS pressure sensor is that the upper electrode 4' deforms, correspondingly when being subjected to external air pressure, and then a capacitance of a parallel plate capacitor formed by the upper electrode 4' and the lower electrode 3' is changed accordingly, so that an output signal of the pressure sensor can be collected via an interface circuit to acquire a corresponding air pressure value, thereby realizing detection of the external air pressure. However, the capacitive MEMS pressure sensor is likely to be subject to common-mode interference such as electromagnetic interference, as it uses the single capacitor for external air pressure detection, resulting in instability and resolution reduction of the output signal of the pressure sensor. Consequently, the performance of a chip is reduced.

Therefore, there is a demand in the art that a new solution to address at least one of the problems in the prior art.

SUMMARY OF THE INVENTION

One object of this invention is to provide a new technical solution for a quasi-differential capacitive MEMS pressure sensor for at least partially filtering a common-mode interference signal generated by, for example, electromagnetic interference in an output signal, so as to improve the stability and the resolution of the output signal.

According to a first aspect of the present invention, there is provided a quasi-differential capacitive MEMS pressure sensor, comprising a substrate, an insulating layer formed on the substrate, a first lower electrode and a second lower electrode respectively formed on the insulating layer, a first upper electrode supported above the first lower electrode, and a second upper electrode supported above the second lower electrode, wherein the first upper electrode is a pressure-sensitive film, and a cavity between the first upper electrode and the first lower electrode is a closed cavity, so that the first upper electrode and the first lower electrode constitute an air pressure-sensitive type capacitor; and the second upper electrode and the second lower electrode constitute a reference capacitor whose capacitance does not vary with external air pressure.

Alternatively or optionally, the closed cavity is a vacuum cavity.

Alternatively or optionally, the air pressure-sensitive type capacitor further comprises an anti-collision projection formed on the first lower electrode and/or an anti-collision projection formed on the insulating layer and penetrating through the first lower electrode to protrude upward, wherein there is a gap between the anti-collision projection and the first upper electrode.

Alternatively or optionally, the second upper electrode is also a pressure-sensitive film; and the reference capacitor further comprises a limiting structure for restricting deformation of the second upper electrode under the action of the external air pressure.

Alternatively or optionally, the first upper electrode and the second upper electrode form an integrated structure.

Alternatively or optionally, the reference capacitor is provided with a supporting post for supporting the second upper electrode to form the limiting structure.

Alternatively or optionally, the reference capacitor is provided with a pressure-balancing hole through which a cavity between the second upper electrode and the second lower electrode of the reference capacitor communicates with the outside so as to form the limiting structure.

Alternatively or optionally, the air pressure-sensitive type capacitor has the same structure as the reference capacitor, except for the limiting structure.

Another object of the present invention is to provide two manufacturing methods of a quasi-differential capacitive MEMS pressure sensor to enable the quasi-differential capacitive MEMS pressure sensor to at least partially filter a common-mode interference signal generated by, for example, electromagnetic interference in an output signal, so as to improve the stability and the resolution of the output signal.

According to a second aspect of the present invention, there is provided a manufacturing method of a quasi-differential capacitive MEMS pressure sensor. The method comprises the following steps: a), depositing a first oxide layer as an insulating layer on a substrate; b), depositing and etching a first metal layer on the insulating layer to form a first lower electrode and a second lower electrode independent of each other; c) depositing and etching a second oxide layer on the first lower electrode and the second lower electrode to form a supporting part and a supporting post corresponding to the second lower electrode; and d), bonding a pressure-sensitive film on the supporting part and the supporting post to form a closed cavity between the pressure-sensitive film and the first lower electrode to enable the pressure-sensitive film, which acts as a first upper electrode, and the first lower electrode to constitute an air pressure-sensitive type capacitor, and to form a second upper electrode supported by the supporting post to enable the second upper electrode and the second lower electrode to constitute a reference capacitor whose capacitance does not vary with external air pressure.

According to a third aspect of the present invention, there is provided another manufacturing method of a quasi-differential capacitive MEMS pressure sensor. The method comprises the following steps: a), depositing a first oxide layer as an insulating layer on a substrate; b), depositing and etching a first metal layer on the insulating layer to form a first lower electrode and a second lower electrode independent of each other; c) depositing and etching a second oxide layer on the first lower electrode and the second lower electrode to form a supporting part; d), bonding a pressure-sensitive film on the supporting part to form a closed cavity between the pressure-sensitive film and the first lower electrode to enable the pressure-sensitive film, which acts as a first upper electrode, and the first lower electrode to constitute an air pressure-sensitive type capacitor, and to form another closed cavity between the pressure-sensitive film and the second lower electrode; and e) etching the pressure-sensitive film to enable the another closed cavity to become a cavity communicating with the outside, enabling the pressure-sensitive film, which acts as a second upper electrode, and the second lower electrode to constitute a reference capacitor whose capacitance does not vary with external air pressure.

Alternatively or optionally, in step c), not only is the second oxide layer etched, but also an anti-collision projection corresponding to the first lower electrode is formed, wherein the top surface of the anti-collision projection is lower than that of the supporting part.

The quasi-differential capacitive MEMS pressure sensor provided by the present invention comprises an air pressure-sensitive type capacitor and a reference capacitor, which have substantially consistent responses to external common-mode interference as they are in the same application environment. Thus, a common-mode interference signal in an output signal of the air pressure-sensitive type capacitor can be at least partially filtered by using an output signal of the reference capacitor, thereby improving the stability and the resolution of the output signal of the air pressure-sensitive type capacitor. In addition, the present invention further provides two manufacturing methods through which a chip satisfying structural requirements of the quasi-differential capacitive MEMS pressure sensor of the present invention can be acquired by the processing substantially the same as those in a conventional capacitive MEMS pressure sensor. Therefore, the manufacturing methods provided by the present invention can acquire the quasi-differential capacitive MEMS pressure sensor whose performance is significantly superior to that of the conventional capacitive MEMS pressure sensor with little production cost difference.

The inventor of the present invention has found that in the prior art, there is a problem that the output signal is poor in resistance ability to common-mode interference, as the capacitive MEMS pressure sensor uses a single capacitor for pressure detection. Therefore, the technical task to be achieved or the technical problem to be solved by the present invention is unintentional or unanticipated for those skilled in the art, and thus the present invention refers to a novel technical solution.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Figure 2:
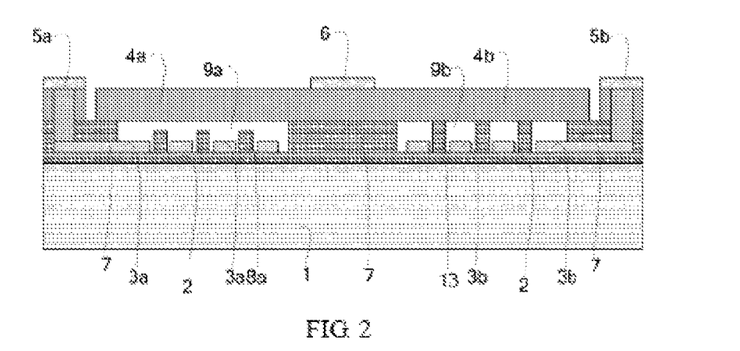
FIG. 2 is a section view of a structure of a quasi-differential capacitive MEMS pressure sensor according to an embodiment of the present invention.
Figure 3:
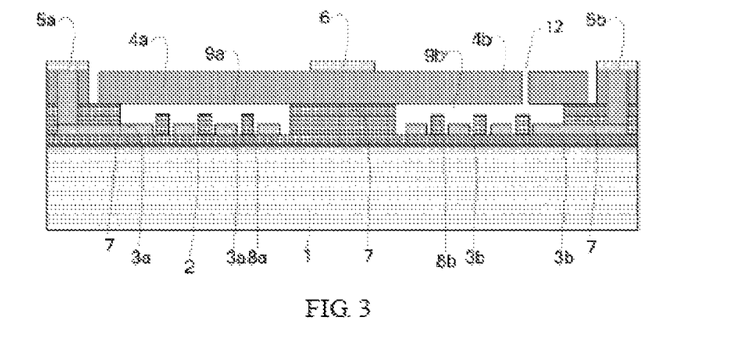
FIG. 3 is a section view of a structure of a quasi-differential capacitive MEMS pressure sensor according to another embodiment of the present invention.

The present invention provides a quasi-differential capacitive MEMS pressure sensor to solve the problem of relatively poor ability to resist to common-mode interference in a conventional capacitive MEMS pressure sensor. As shown in FIGS. 2 and 3, the pressure sensor provided by the present invention comprises a substrate 1, an insulating layer 2 formed on the substrate 1, a first lower electrode 3a and a second lower electrode 3b respectively formed on the insulating layer 2, a first upper electrode 4a supported above the first lower electrode 3a, and a second upper electrode 4b supported above the second lower electrode 3b, wherein the first upper electrode 4a is a pressure-sensitive film, and a cavity between the first upper electrode 4a and the first lower electrode 3a is a closed cavity 9a, so that the first upper electrode 4a and the first lower electrode 3a constitute an air pressure-sensitive type capacitor. Here, in order to eliminate the influence of temperature change and the like of the closed cavity 9a on the detection accuracy of the air pressure-sensitive type capacitor, and to acquire absolute pressure conveniently, particularly, the closed cavity 9a is a vacuum cavity. Moreover, the second upper electrode 4b and the second lower electrode 3b constitute a reference capacitor whose capacitance does not vary with external air pressure. The air pressure-sensitive type capacitor and the reference capacitor are in the same application environment, so that they have substantially consistent responses to external common-mode interference. Thus, a common-mode interference signal in an output signal of the air pressure-sensitive type capacitor can be at least partially filtered by using an output signal of the reference capacitor, thereby improving the stability and the resolution of the output signal of the air pressure-sensitive type capacitor.

In practical application, external air pressure change may exceed a detection range of the pressure sensor. When the external air pressure exceeds an upper detection limit of the pressure sensor, the first upper electrode 4a may be probably concave downward greatly to be in contact with the first lower electrode 3a, and accordingly, adhesion or short-circuit discharge occurs, so that the pressure sensor is likely to fail or be burned in this case. In order to solve this problem, an anti-collision projection 8a for preventing the first upper electrode 4a from being in contact with the first lower electrode 3a is formed on the first lower electrode 3a, and there is a gap reserved between the anti-collision projection 8a and the first upper electrode 4a, so that a space allowing the first upper electrode 4a to deform downward is formed between the anti-collision projection 8a and the first upper electrode 4a. In addition, as the anti-collision projection 8a should be an insulator, it can be made of a material the same as that of the insulating layer 2. Therefore, in order to improve the connection strength of the anti-collision projection 8a, as shown in FIGS. 2 and 3, the anti-collision projection 8a may also be formed on the insulating layer 2. Here, it is necessary to provide a through-hole on first lower electrode 3a allowing the anti-collision projection 8a to penetrate through, so that the anti-collision projection 8a can penetrate through the corresponding through-hole to protrude upward.

In order to manufacture the above-mentioned air pressure-sensitive type capacitor and the reference capacitor concurrently via substantially the same process steps, and to improve the response consistency of the air pressure-sensitive capacitor and the reference capacitor to the external common-mode interference, the second upper electrode 4b may also adopt a pressure-sensitive film. Here, the first upper electrode 4a and the second upper electrode 4b may be independent of each other or may form an integrated structure (i.e., the first upper electrode 4a and the second upper electrode 4b are as one pressure-sensitive film). In order to prevent the second upper electrode 4b from deforming correspondingly along with the change of the external air pressure, the reference capacitor should further comprise a limiting structure for restricting the deformation of the second upper electrode 4b under the action of the external air pressure. In addition, the second upper electrode 4b may be made of a material which does not deform within the detection range of the pressure sensor provided by the present invention; and the material is selected preferably based on a condition that a response difference between the second upper electrode 4b and the first upper electrode 4a to changes of non-air pressure factors such as temperature is within an allowable error range of the pressure sensor.

As shown in FIG. 2, the above-mentioned limiting structure may be implemented by arranging a supporting post 13 for supporting the second upper electrode 4b. The supporting post 13 may be arranged on the second lower electrode 3b. However, as the supporting post 13 should be an insulator, in order to improve the connection strength of the supporting post 13, it may be arranged on the insulating layer 2. Here, it is necessary to provide a through-hole on the second lower electrode 3b allowing the supporting post 13 to penetrate through, so that the supporting post 1 can penetrate through the corresponding through-hole to extend upward to reach the position of the second upper electrode 4b.

As shown in FIG. 3, the above-described limiting structure may also be implemented by forming a pressure-balancing hole 12 in the reference capacitor to enable a cavity 9b' between the second upper electrode 4b and the second lower electrode 3b of the reference capacitor to be communicated with the outside through the pressure-balancing hole 12. Thus, air pressure in the cavity 9b' changes correspondingly in accordance with the change of the external air pressure, achieving the purpose of restricting the deformation of the second upper electrode 4b under the action of the external air pressure through the pressure-balancing hole 12, and realizing an effect of keeping positions of all points on the second upper electrodes 4b unchanged. Here, the pressure-balancing hole 12 may be formed in the second upper electrode 4b to simplify a manufacturing process of the pressure sensor.

In order to make the responses of the air pressure-sensitive capacitor and the reference capacitor to the external common-mode interference substantially the same, so as to filter out a common-mode interference signal in an output signal of the air pressure-sensitive type capacitor to the maximum extent and eliminate the influence of an output signal of the reference capacitor on an effective signal in the output signal of the air pressure-sensitive type capacitor. particularly, the air pressure-sensitive type capacitor has the same structure as the reference capacitor except for the limiting structure, so that the initial capacitances of the air pressure-sensitive type capacitor and the reference capacitor are substantially the same. Here, the same structure means that the materials, shapes and sizes of corresponding parts as well as the positional relationships relative to other parts and the like of the air pressure-sensitive type capacitor and the reference capacitor are the same. Thus, in combination with the embodiment of implementing the limiting structure through the pressure-balancing hole 12, as shown in FIG. 3, the reference capacitor should further be provided with a projection 8b corresponding to the anti-collision projection 8a. Moreover, in combination with the embodiment of implementing the limiting structure through the supporting post 13, on the basis of FIG. 3, the projection 8b should continuously extend upwardly to reach the second upper electrode 4b to form the supporting post 13 as shown in FIG. 2, and the cavity 9b should also be a closed cavity, or even a vacuum cavity.

In order to connect the pressure sensor provided by the present invention to an external circuit, as shown in FIGS. 2 and 3, the pressure sensor should be provided with a first lower electrode bonding pad 5a electrically connected to the first lower electrode 3a, a second lower electrode bonding pad 5b electrically connected to the second lower electrode 3b, a first upper electrode bonding pad electrically connected to the first upper electrode 4a, and a second upper electrode bonding pad electrically connected to the second upper electrode 4b. When the first upper electrode 4a and the second upper electrode 4b are integrally formed, the first upper electrode bonding pad and the second upper electrode bonding pad may be combined together to form an upper electrode bonding pad 6.

In addition, the substrate 1 may comprise two mutually independent sub-substrates corresponding to the air pressure-sensitive capacitor and the reference capacitor, respectively, or may be a substrate with an integrated structure. The insulating layer 2 may also comprise two mutually independent sub-insulating layers corresponding to the air pressure-sensitive capacitor and the reference capacitor, respectively, or may be an insulating layer with an integrated structure. Similarly, the supporting part 7 may comprise two mutually independent sub-supporting parts corresponding to the air-pressure-sensitive type capacitor and the reference capacitor, respectively, or may be a supporting part with an integrated structure.

Figure 4:
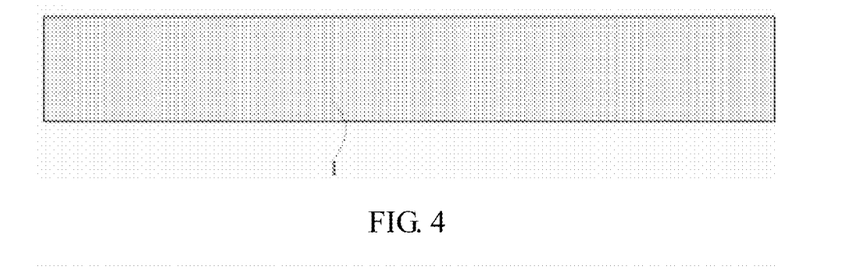
FIGS. 4-11 show the processing flow charts of the manufacturing method of a quasi-differential capacitive MEMS pressure sensor provided by the present invention.
Figure 5:
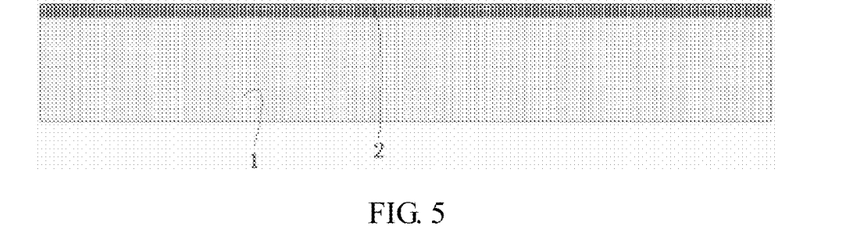
Figure 6:
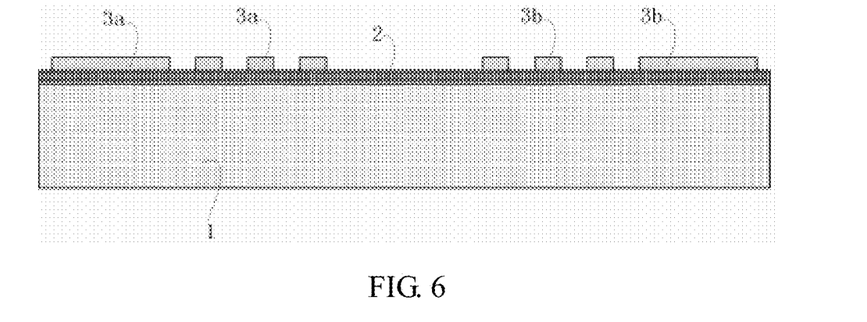
Figure 7:
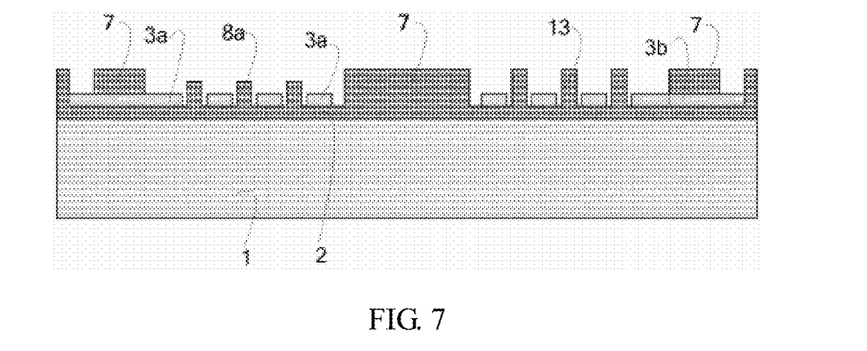
Figure 8:
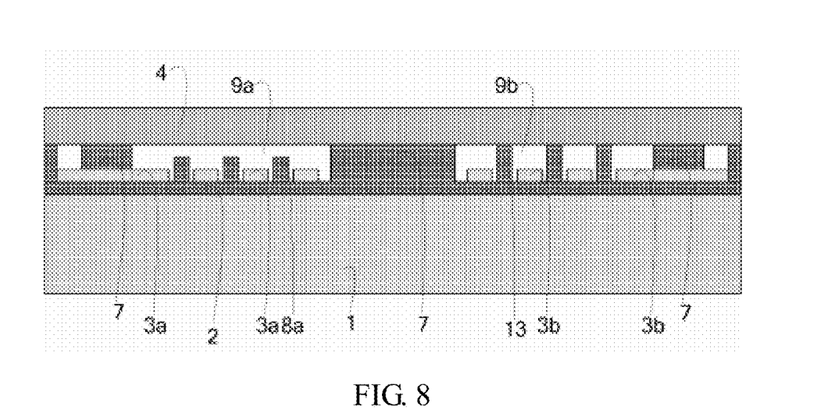

The present invention further provides two manufacturing methods through which a chip satisfying structural requirements of the quasi-differential capacitive MEMS pressure sensor of the present invention can be acquired by the processing substantially the same as those in a conventional capacitive MEMS pressure sensor, so as to acquire the quasi-differential capacitive MEMS pressure sensor whose performance is significantly superior to that of the conventional capacitive MEMS pressure sensor with little production cost difference. FIGS. 4-11 show the processing steps of a manufacturing method of a pressure sensor shown in FIG. 2. The manufacturing method particularly comprises the following steps.

a) As shown in FIG. 4, a substrate 1 is prepared, and then a first oxide layer, which acts as an insulating layer 2, is deposited on the substrate 1 as shown in FIG. 5.

b) As shown in FIG. 6, a first metal layer is deposited and etched on the insulating layer 2 to form a first lower electrode 3a and a second lower electrode 3b independent of each other.

c) As shown in FIG. 7, a second metal layer is deposited and etched on the first lower electrode 3a and the second lower electrode 3b to form a supporting part 7 and a supporting post 13 corresponding to the second lower electrode 3b, wherein the top surface of the supporting post 13 should be flush with that of the supporting part 7.

d) As shown in FIG. 8, a pressure-sensitive film 4 is bonded on the supporting part 7 and the supporting post 13 to form a closed cavity 9a between the pressure-sensitive film 4 and the first lower electrode 3a to enable the pressure-sensitive film 4 that acts as the first upper electrode 4a and the first lower electrode 3a to constitute an air pressure-sensitive type capacitor, and to form a second upper electrode 4b supported by the supporting post 13 to enable the pressure-sensitive film 4 that acts as the second upper electrode 4b and the second lower electrode 3b to constitute a reference capacitor whose capacitance does not vary with external air pressure. Here, in order to improve the structural symmetry of the air pressure-sensitive type capacitor and the reference capacitor, the pressure-sensitive film 4 is boned on the supporting part 7 and the supporting post 13, and another closed cavity 9b may be formed between the pressure-sensitive film 4 and the second lower electrode 3b. In an embodiment that it is required that the closed cavities 9a and 9b are vacuum cavities, the above-described bonding operations can be performed in the vacuum cavities.

Figure 9:
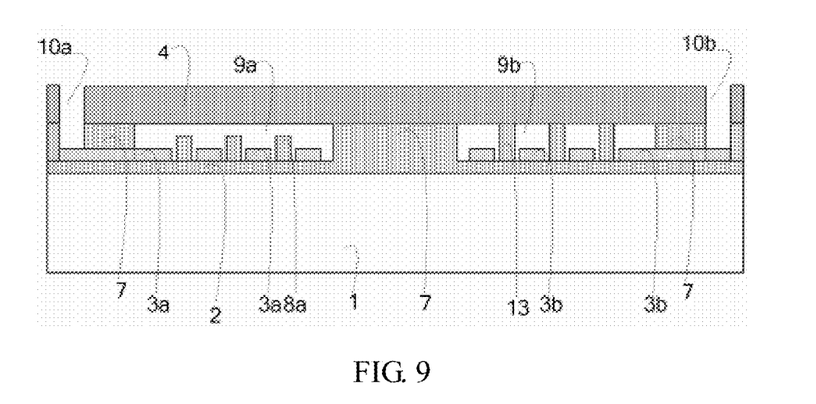
Figure 10:
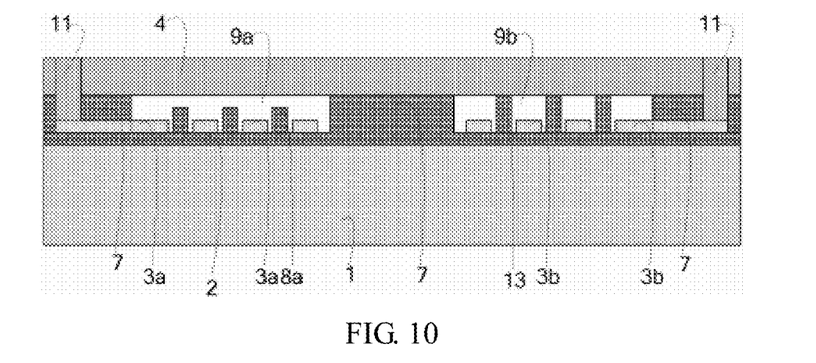
Figure 11:
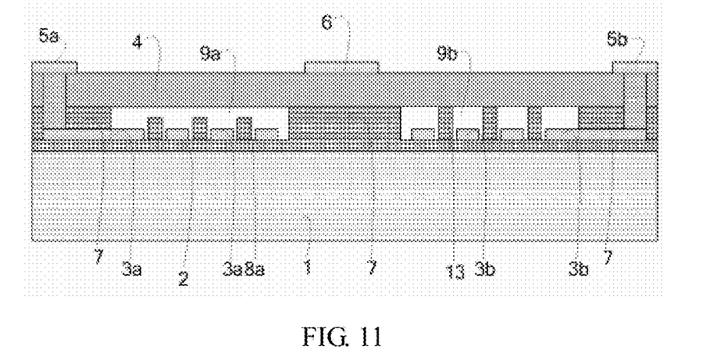

After the above steps, the method further comprises a step of externally leading out the first lower electrode 3a, the second lower electrode 3b and the pressure-sensitive film 4 in a conventional manner. The steps are particularly shown as follows.

e) As shown in FIG. 9, the pressure-sensitive film 4 is etched to form a first connecting through-hole 10a leading to the first lower electrode 3a and a second connecting through-hole 10b leading to the second lower electrode 3b.

f) As shown in FIG. 10, the first connecting through-hole 10a and the second connecting through-hole 10b are filled with a conductive material 11 respectively.

g) As shown in FIG. 11, a second metal layer is deposited and etched on the pressure-sensitive film 4 to form a first lower electrode bonding pad 5a electrically connected to the first lower electrode 3a through the conductive material 11, a second lower electrode bonding pad 5b electrically connected to the second lower electrode 3b through the conductive material 11, and an upper electrode bonding pad 6 electrically connected to the pressure-sensitive film 4.

h) The pressure-sensitive film 4 is etched to enable the first lower electrode bonding pad 5a, the second lower electrode bonding pad 5b and the upper electrode bonding pad 6 to be insulated from one another, so as to form the pressure sensor as shown in FIG. 2.

Referring to FIGS. 4-11, a manufacturing method of a pressure sensor shown in FIG. 3 comprises the following steps.

a) As shown in FIG. 4, a substrate 1 is prepared, and then a first oxide layer which acts as an insulating layer 2, is deposited on the substrate 1, as shown in FIG. 5.

b) As shown in FIG. 6, a first metal layer is deposited and etched on the insulating layer 2 to form a first lower electrode 3a and a second lower electrode 3b independent of each other.

c) As shown in FIG. 7, a second oxide layer is deposited and etched on the first lower electrode 3a and the second lower electrode 3b to form a supporting part 7.

d) The pressure-sensitive film 4 is bonded on the supporting part 7 to form a closed cavity 9a between the pressure-sensitive film 4 and the first lower electrode 3a to enable the pressure-sensitive film 4, which acts as a first upper electrode 4a, and the first lower electrode 3a to constitute an air pressure-sensitive type capacitor, and to form another closed cavity between the pressure-sensitive film 4 and the second lower electrode 3b.

e) The pressure-sensitive film 4 is etched to enable the another closed cavity to be a cavity 9b' communicating with the outside, so that the pressure-sensitive film 4, which acts as a second upper electrode 4b, and the second lower electrode 3b constitute a reference capacitor whose capacitance does not vary with the external air pressure.

After the above steps, the method further comprises steps of externally leading out the first lower electrode 3a, the second lower electrode 3b and the pressure-sensitive film 4 in a conventional manner. The steps are particularly shown as follows.

e) A first connecting through-hole 10a leading to the first lower electrode 3a and a second connecting through-hole 10b leading to the second lower electrode 3b are further formed when the pressure-sensitive film 4 is etched.

f) The first connecting through-hole 10a and the second connecting through-hole 10b are filled with a conductive material 11 respectively.

g) A second metal layer is deposited and etched on the pressure-sensitive film 4 to form a first lower electrode bonding pad 5a electrically connected to the first lower electrode 3a through the conductive material 11, a second lower electrode bonding pad 5b electrically connected to the second lower electrode 3b through the conductive material 11, and an upper electrode bonding pad 6 electrically connected to the pressure-sensitive film 4.

h) The pressure-sensitive film 4 is etched to enable the first lower electrode bonding pad 5a, the second lower electrode bonding pad 5b and the upper electrode bonding pad 6 to be insulated from one another, so as to form the pressure sensor as shown in FIG. 3.

With respect to the embodiment in which the air pressure-sensitive sensor is provided with an anti-collision projection 8a, in the above-mentioned two manufacturing methods, during etching the second oxide layer in step c), the anti-collision projection 8a corresponding to the first lower electrode 3a may be further directly formed, wherein the top surface of the anti-collision projection 8a should be lower than that of the supporting part 7. With respect to the embodiment in which the reference capacitor is provided with a projection 8b, in the above second manufacturing method, during etching the second oxide layer in step c), the projection 8b corresponding to the second lower electrode 3b may be further directly formed.

In addition, if the substrate 1 is divided into two mutually independent sub-substrates respectively corresponding to the air pressure-sensitive type capacitor and the reference capacitor, the insulating layer 2 is divided into two mutually independent sub-insulating layers respectively corresponding to the air pressure-sensitive type capacitor and the reference capacitor, the supporting part 7 is divided into two mutually independent sub-supporting parts respectively corresponding to the air pressure-sensitive type capacitor and the reference capacitor, and/or the pressure-sensitive film 4 is divided into the first upper electrode 4a and the second upper electrode 4b independent of each other, each of the above-mentioned manufacturing method may further comprise a step of etching the substrate 1, the insulating layer 2, the second oxide layer and/or the pressure-sensitive film 4 to form the above-mentioned divided structures.

Although some specific embodiments of the present invention have been demonstrated in detail with examples, it should be understood by a person skilled in the art that the above examples are only intended to be illustrative but not to limit the scope of the present invention.

What is claimed is:

1. A quasi-differential capacitive MEMS pressure sensor, comprising: a substrate, an insulating layer formed on the substrate, a first lower electrode and a second lower electrode respectively formed on the insulating layer, a first upper electrode supported above the first lower electrode, and a second upper electrode supported above the second lower electrode, wherein the first upper electrode is a pressure-sensitive film, a cavity between the first upper electrode and the first lower electrode is a closed cavity, so that the first upper electrode and the first lower electrode constitute an air pressure-sensitive type capacitor, the air pressure-sensitive type capacitor further comprising an anti-collision projection formed on the first lower electrode and/or an anti-collision projection formed on the insulating layer and penetrating through the first lower electrode to protrude upward, wherein there is a gap between the anti-collision projection and the first upper electrode; and the second upper electrode and the second lower electrode constitute a reference capacitor whose capacitance does not vary with external air pressure.

2. The quasi-differential capacitive MEMS pressure sensor of claim 1, wherein the closed cavity is a vacuum cavity.

3. The quasi-differential capacitive MEMS pressure sensor of claim 1, wherein the second upper electrode is also a pressure-sensitive film; and the reference capacitor further comprises a limiting structure for restricting deformation of the second upper electrode under the action of the external air pressure.

4. The quasi-differential capacitive MEMS pressure sensor of claim 3, wherein the first upper electrode and the second upper electrode form an integrated structure.

5. The quasi-differential capacitive MEMS pressure sensor of claim 3, wherein the reference capacitor is provided with a supporting post for supporting the second upper electrode to form the limiting structure.

6. The quasi-differential capacitive MEMS pressure sensor of claim 3, wherein the reference capacitor is provided with a pressure-balancing hole through which a cavity between the second upper electrode and the second lower electrode of the reference capacitor communicates with the outside so as to form the limiting structure.

7. The quasi-differential capacitive MEMS pressure sensor of claim 3, wherein the air pressure-sensitive type capacitor has the same structure as the reference capacitor, except for the limiting structure.

8. A manufacturing method of a quasi-differential capacitive MEMS pressure sensor, the method comprising the following steps: a), depositing a first oxide layer as an insulating layer on a substrate; b), depositing and etching a first metal layer on the insulating layer to form a first lower electrode and a second lower electrode independent of each other; c) depositing and etching a second oxide layer on the first lower electrode and the second lower electrode to form a supporting part and a supporting post corresponding to the second lower electrode; and d), bonding a pressure-sensitive film on the supporting part and the supporting post to form a closed cavity between the pressure-sensitive film and the first lower electrode to enable the pressure-sensitive film, which acts as a first upper electrode, and the first lower electrode to constitute an air pressure-sensitive type capacitor, and to form a second upper electrode supported by the supporting post, to enable the second upper electrode and the second lower electrode to constitute a reference capacitor whose capacitance does not vary with external air pressure.

9. A manufacturing method of a quasi-differential capacitive MEMS pressure sensor, the method comprising the following steps: a), depositing a first oxide layer as an insulating layer on a substrate; b), depositing and etching a first metal layer on the insulating layer to form a first lower electrode and a second lower electrode independent of each other; c) depositing and etching a second oxide layer on the first lower electrode and the second lower electrode to form a supporting part; d), bonding a pressure-sensitive film on the supporting part to form a closed cavity between the pressure-sensitive film and the first lower electrode to enable the pressure-sensitive film, which acts as a first upper electrode, and the first lower electrode to constitute an air pressure-sensitive type capacitor, and to form another closed cavity between the pressure-sensitive film and the second lower electrode; and e) etching the pressure-sensitive film to enable the another closed cavity to become a cavity communicating with the outside, enabling the pressure-sensitive film, which acts as a second upper electrode, and the second lower electrode to constitute a reference capacitor whose capacitance does not vary with external air pressure.

* * * * *